May 23, 1950 — W. McMAHON — 2,509,068
POLARIMETRIC METHOD AND MEANS OF DETERMINING
THE DEGREE OF ALIGNMENT OF FIBERS
Filed Feb. 20, 1948
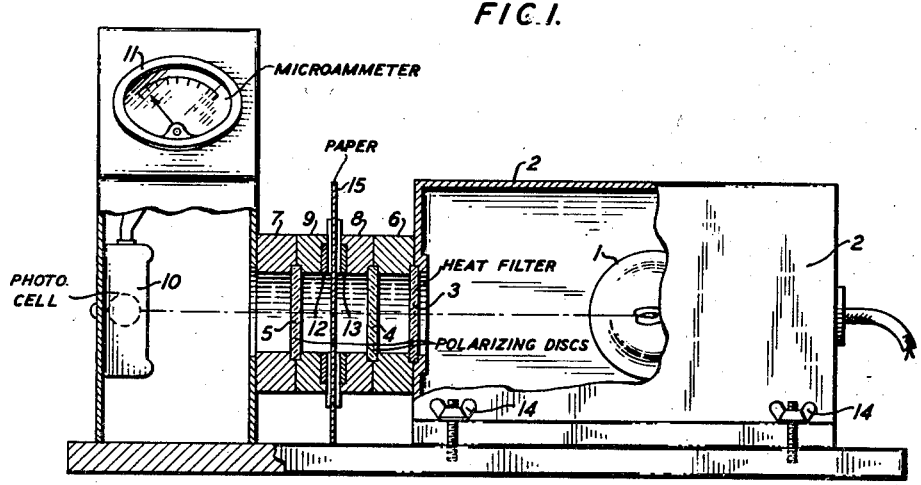
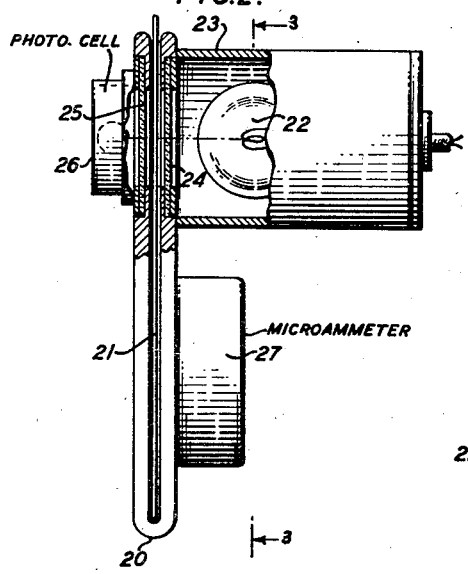
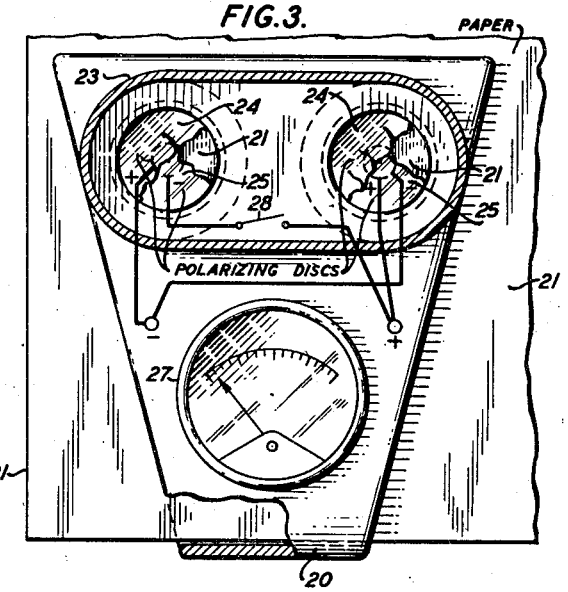
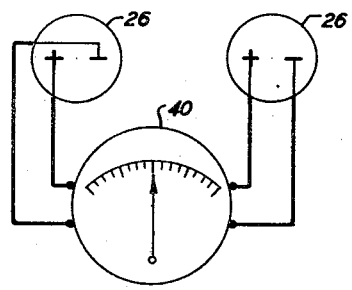
INVENTOR
W. McMAHON
BY
W. R. Dawson
ATTORNEY Patented May 23, 1950

2,509,068

UNITED STATES PATENT OFFICE 2,509,068

POLARIMETRIC METHOD AND MEANS OF DETERMINING THE DEGREE OF ALIGNMENT OF FIBERS

William McMahon, Summit, N. J., assignor to Bell Telephone Laboratories, Incorporated, New York, N. Y., a corporation of New York Application February 20, 1948, Serial No. 9,905

4 Claims. (Cl. 88—14)

This invention relates to a method and means for determining the formation of an anisotropic translucent material.

The object of the invention is a method and means for the determination of the ratio of the maximum and minimum values of plane polarized light transmitted through an anisotropic translucent material, such as paper.

A feature of the invention is apparatus for transmitting plane polarized light through the material with the plane of polarization oriented to produce a maximum value of light from the analyzer.

Another feature of the invention is apparatus for transmitting plane polarized light through the material with the plane of polarization oriented to produce a minimum value of light from the analyzer.

A further feature of the invention is means for indicating the ratio of the maximum and the minimum values of the light from the analyzer.

Paper usually consists mainly of cellulose fibers, with a small amount of amorphous organic substances, such as lignin, gums, pectins, etc., and traces of inorganic impurities. During the manufacture of the paper, as the pulp is flowed upon the moving wire screen, the cellulose fibers tend to become aligned in the direction in which the screen is moving, and this alignment of the fibers is increased by calendering. This effect is even more pronounced on a cylinder-type papermaking machine. A somewhat similar effect is found in connection with some translucent plastic substances, such as cellophane, photographic film base, etc.

The formation of a paper is defined as the uniformity with which the fibers and other solid components are distributed. The formation of a paper will involve several different factors such as the uniformity of distribution of the fibers and other solid components in any plane parallel to the surface of the paper, the uniformity of the thickness of the paper in planes normal to the surface of the paper, and the degree of orientation of the cellulose fibers in the volume of the paper.

In some prior systems unpolarized light has been used to measure the gross transmission of paper pulp, paper and similar substances, but such measurements only determine the presence of more or less fibers in a given volume of the material and do not give any indication of the degree of alignment of the fibers. Also, in other prior systems polarized light is used to measure the gross optical properties of transparent and translucent materials, and the concentration, color dispersion, etc. of fluids, but none of these tests give any indication of the degree of alignment of the fibers in the material.

The cellulose fibers in paper, and some of the molecular combinations in translucent materials, are optically anisotropic; that is, the fibers have at least two optical axes with different indices of refraction and transmission. If the distribution of the fibers or molecules is perfectly random, and the material is of uniform thickness, the transmission of plane polarized light will be the same for all planes normal to the surface of the material. But, if light polarized in one plane is transmitted through a number of aligned cellulose fibers and is analyzed by an analyzing screen having its axis aligned at 90 degrees to the plane of polarization, maximum light will be transmitted through the analyzer when the fibers are aligned at a certain angle with respect to the plane of polarization, and minimum light will be transmitted when the fibers are rotated about 45 degrees from this position. Thus, in one complete rotation of the fibers with respect to the plane of polarization of the light, maximum light will be transmitted at four positions spaced about 90 degrees apart; and minimum light will be transmitted at four positions spaced about 90 degrees apart and about midway between the positions of maximum transmission. The points of maximum and minimum transmission are not very sharply defined as the transmission changes fairly slowly for several degrees on each side of these points.

Similarly, when a sheet of paper, or suitable plastic is tested in the same manner, a maximum amount of light will be transmitted when the sheet is in a certain position, a minimum amount of light will be transmitted when the sheet is turned through 45 degrees, and these maxima and minima will recur every 90 degrees. The amorphous materials produce the same extinction of the light in all positions, and, if present in fairly small quantities do not materially affect the variation of the light transmitted by the fibers.

In the drawings,

Fig. 1 diagrammatically shows a device embodying the invention;

Figs. 2 and 3 diagrammatically show another device embodying the invention; and

Fig. 4 shows another form of the device shown in Fig. 3.

In Fig. 1, a source of light 1 is conveniently supported in a light-tight enclosure 2 having an aperture closed by a heat filter 3. A polarizer 4 and analyzer 5 are supported by suitable light-tight elements 6, 7, 8, 9 in alignment with the aperture of the enclosure 2. The polarizer 4 and analyzer 5 have their axes crossed at 90 degrees to each other and may conveniently be made of discs of the polarizing material known under the trade name of "Polaroid." The transmitted light is directed to a light-sensitive cell 10 connected to a sensitive meter 11. The light-sensitive cell 10 may be of the photovoltaic type, connected directly, or through a suitable amplifier, to the meter 11, or of the photoemissive type connected through a suitable amplifier to the meter 11. A pair of rotatable rings 12, 13, may be mounted in the elements 8, 9. The thumb screws 14 may pass through slotted holes in the container 2, and by loosening the screws 14 and displacing the container 2, a sample of paper 15 may be inserted between the rings 12, 13. The container 2 is then moved to clamp the paper between the rings 12, 13, and secured by the screws 14. The paper and rings 12, 13 may then be rotated with respect to the plane of polarization of the light from the polarizer 4. An indicating mark and scale may be engraved on the element 8 and ring 13, or element 9 and ring 12, to measure the degree of rotation.

While one specific type of apparatus has been described, it is evident many changes may be made in this device within the scope of the invention.

A number of samples of material have been measured with this device, and the results plotted in terms of the reading in microamperes of the meter 11 against the angular position of the rings 12, 13. The resultant curves may be expressed by $$L = A + B \sin^2 2\theta \quad (1)$$

where
L = light energy transmitted
$\theta$ = angle of rotation of sample
A and B are constants.

When $\theta=0$, $B \sin^2 2\theta = 0$, and L equals its minimum value A; when $\theta=45°$, $B \sin^2 2\theta = B$, and L equals its maximum value A+B.

The total transmitted light L may be separated into the part represented by A, which is constant at all angular positions and is contributed by the randomly distributed fibers, and the part represented by $B \sin^2 2\theta$ which is contributed by the oriented fibers.

Integrating these two parts over a cycle of variation, or $$\frac{\Pi}{2} \text{ radians}, \int_0^{\frac{\Pi}{2}} A d\theta = \frac{\Pi}{2} A$$

for the random group, and $$\int_0^{\frac{\Pi}{2}} B \sin^2 2\theta d\theta = \frac{\Pi}{4} B$$

for the oriented group.

The equation for the transmission of light through a single crystal or aligned fiber of anisotropic material is $$L = C \sin^2 2\theta \quad (2)$$

where
L = light energy transmitted.
$\theta$ = angular displacement of optical axis of the fiber with respect to the plane of polarization of the light.
C = a constant.

The sample may be considered to be made up of N fibers, of which $N_1$ of the fibers are randomly distributed and $N_2$ are oriented. For one cycle, the contribution to the transmitted light of the random fibers will be $$\frac{\Pi}{4} N_1 C$$

and the contribution of the oriented fibers will be $$\frac{\Pi}{4} N_2 C$$

Equating the similar expressions $$\frac{\Pi}{2} A = \frac{\Pi}{4} N_1 C \text{ and } \frac{\Pi}{4} B = \frac{\Pi}{4} N_2 C$$

thus $$\frac{N_2}{N_1} = \frac{B}{2A}$$

the ratio of the number of oriented fibers to the number of random fibers.

The ratio $$\frac{A+B}{A}$$

that is, the ratio of the maximum value of the light transmitted to the minimum value of the light transmitted may be termed the Fiber orientation factor F. Then $$\frac{N_2}{N_1} = \frac{F-1}{2} \text{ and } F = 2\frac{N_2}{N_1} + 1 = \frac{A+B}{A}$$

If four samples respectively have values of F=1.5, 2.0, 2.5, 3.0, the corresponding values of $$\frac{N_2}{N_1}$$

will be 0.25, 0.50, 0.75, 1.0.

Also, the ratio of the number of oriented fibers to the total number of fibers, $$\frac{N_2}{N_1+N_2} = \frac{B}{2A+B} = \frac{F-1}{F+1}$$

Thin sheets of kraft paper are commonly used as the dielectric in metal foil capacitors, and it has been found by test that papers having similar chemical and mechanical properties may show wide differences in useful life in such service, but the effective life of such capacitors is found to be approximately proportional to the Fiber orientation factor of the paper used. The determination of this factor thus is an effective test for selecting paper suited for this service, and may also be used during the manufacture of the paper to indicate the effect of changes in the process of manufacture of the paper to produce a large value of fiber orientation.

The device shown in Figs. 2, 3, 4, is adapted for determining the fiber orientation in a sheet of material during the process of manufacture. A U-shaped frame 20 is supported on both sides of the moving sheet of material 21. A source 22, or sources, of light is supported in a light-tight container 23, mounted on one side of the frame 20. The light from the source 22 is directed through two apertures in the container 23, and two apertures in the frame 20. Two polarizing discs 24 are rotatably mounted in the apertures in the front member of the frame 20. Two analyzing discs 25 having their axes crossed at 90 degrees with the corresponding polarizer, are rotatably mounted in the apertures in the rear member of the frame 20 in registry with the apertures in the front member and in front of two light-sensitive cells 26. The light-sensitive cell corresponding to the right-hand aperture, Fig. 3, is connected to a microammeter 27, and the plane of polarization of the polarizing disc 24 in this aperture is adjusted to produce a maximum reading, $A+B$, of the meter 27 the corresponding analyzing disc 25 being similarly adjusted to keep the axes of the polarizing and analyzing discs crossed at 90 degrees. The plane of polarization of the polarizing disc 24 in the left-hand aperture is adjusted to produce a minimum reading A the corresponding analyzing disc 25 being similarly adjusted to keep the axes of the polarizing and analyzing discs crossed at 90 degrees and the light-sensitive cell corresponding to this aperture may be connected through switch 28 to meter 27, so that the current from this cell will oppose the current from the other cell and give a meter reading of $A+B-A=B$. From the readings of $A+B$ and $A$, the ratio $$\frac{A+B}{A}$$

may be obtained.

For a continuous reading of the ratio $$\frac{A+B}{A}$$

the right-hand cell 26 may be connected to one coil of a ratiometer 40 of any suitable type, such as the meter shown in United States Patent 1,918,023, July 11, 1933, H. T. Faus. The left-hand cell 26 may be connected to the other coil of meter 40, so that the meter will indicate the ratio of the currents from the two cells, $$\frac{A+B}{A}$$

The meter 27 may be removed, or may be retained to indicate the maximum current.

What is claimed is:

1. Apparatus for determining the degree of alignment of the fibers of an anisotropic material comprising means for first, projecting a beam of plane polarized light upon said material, means for analyzing in a plane normal to the plane of polarization the light from said beam transmitted through said material, means activated by the analyzed light from said first beam to generate a first electric current, means for adjusting the relative relation of the plane of polarization of said beam to said material to make said first current a maximum; second, means for projecting a beam of plane polarized light upon said material, means for analyzing in a plane normal to the plane of polarization the light from said second beam transmitted through said material, means activated by the analyzed light from said second beam to generate a second electric current, means for adjusting the relative relation of the plane of polarization of said second beam to said material to make said second current a minimum, and means for indicating the ratio of said currents to determine the degree of alignment of the fibers.

2. Apparatus for determining the degree of alignment of the fibers of an anisotropic material comprising a source of light, a first pair of polarizing and analyzing elements having their axes crossed at substantially 90 degrees, a first light-sensitive cell energized by light from said source transmitted through said first pair of elements to generate a first electric current, a second pair of polarizing and analyzing elements having their axes crossed at substantially 90 degrees and inclined at substantially 45 degrees to the axes of said first pair, a second light-sensitive cell energized by light from said source transmitted through said second pair of elements to generate a second electric current, means for guiding the material between the elements of said first pair to make said first current a maximum, and between the elements of said second pair to make said second current a minimum, and a meter connected to both said cells to indicate the ratio of said currents.

3. Apparatus for determining the degree of alignment of the fibers of an anisotropic material comprising a source of light, a first pair of polarizing and analyzing elements arranged to plane polarize and normally substantially extinguish a first beam of light from said source, a second pair of polarizing and analyzing elements arranged to plane polarize and normally substantially extinguish a second beam of light from said source, means for guiding the material between the elements of said first pair to make the light transmitted by said first analyzing element a maximum and between the elements of said second pair to make the light transmitted by said second analyzing element a minimum, and means energized by said transmitted light to indicate the ratio of the light transmitted through said first analyzing element to the light transmitted through said second analyzing element.

4. The method of determining the degree of alignment of the optically anisotropic fibers of a material such as paper, which comprises, projecting a beam of plan polarized light through the material, analyzing in a plane normal to the plane of polarization of the beam the light transmitted through the material, generating a first electric current with the analyzed light, adjusting the plane of polarization of the beam relative to the material to make the amplitude of the first current a maximum, projecting another beam of plane polarized light through the material, analyzing in a plane normal to the plane of polarization the light from the latter beam transmitted through the material, generating a second electric current with the analyzed light of the latter beam, adjusting the plane of polarization of the latter beam relative to the material to make the amplitude of the second current a minimum, and indicating the ratio of the first current to the second current to determine the degree of alignment of the fibers.

WILLIAM McMAHON.

REFERENCES CITED

The following references are of record in the file of this patent:

UNITED STATES PATENTS

| Number | Name | Date |
|---|---|---|
| 1,551,843 | Nyswander | Sept. 1, 1925 |
| 1,934,187 | Glasgow et al. | Nov. 7, 1933 |
| 2,332,308 | Dresser | Oct. 19, 1943 |
| 2,427,259 | Chubb | Sept. 9, 1947 |
| 2,441,049 | West | May 4, 1948 |

OTHER REFERENCES

Journal of Physical Chemistry, article by McNally et al., volume 34, January-June 1930, pages 165 to 172.

Journal of Physical Chemistry, article by Spence, volume 43, October 1939, pages 865 to 872.